(12) United States Patent
Adler et al.

(10) Patent No.: US 11,372,674 B2
(45) Date of Patent: *Jun. 28, 2022

(54) METHOD, APPARATUS AND SYSTEM FOR HANDLING NON-POSTED MEMORY WRITE TRANSACTIONS IN A FABRIC

(71) Applicant: Intel Corporation, Santa Clara, CA (US)

(72) Inventors: Robert P. Adler, Santa Clara, CA (US); Robert De Gruijl, San Francisco, CA (US); Sridhar Lakshmanamurthy, Sunnyvale, CA (US); Ramadass Nagarajan, Portland, OR (US); Peter J. Elardo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/080,970

(22) Filed: Oct. 27, 2020

(65) Prior Publication Data

US 2021/0042147 A1    Feb. 11, 2021

Related U.S. Application Data

(63) Continuation of application No. 15/391,984, filed on Dec. 28, 2016, now Pat. No. 10,846,126.

(51) Int. Cl.
*G06F 9/46* (2006.01)
*G06F 13/42* (2006.01)
(Continued)

(52) U.S. Cl.
CPC .......... *G06F 9/467* (2013.01); *G06F 13/4282* (2013.01); *G06F 15/76* (2013.01); *G06F 15/781* (2013.01); *G06F 2213/0026* (2013.01)

(58) Field of Classification Search
CPC ...... G06F 9/467; G06F 13/4282; G06F 15/76; G06F 15/781
See application file for complete search history.

(56) References Cited

U.S. PATENT DOCUMENTS 5,493,566 A    2/1996 Ljungberg et al.
6,009,488 A    12/1999 Kavipurapu
(Continued)

FOREIGN PATENT DOCUMENTS

CN    1819555    8/2006
CN    1833415    9/2006
(Continued)

OTHER PUBLICATIONS

International Searching Authority, "Notification of Transmittal of the International Search Report and the Written Opinion of the International Searching Authority," dated Mar. 5, 2018, in International application No. PCT/US2017/062466.
(Continued)

*Primary Examiner* — Henry Tsai
*Assistant Examiner* — Christopher A Daley
(74) *Attorney, Agent, or Firm* — Trop, Pruner & Hu, P.C.

(57) ABSTRACT

In one embodiment, a system on chip includes a first endpoint to issue a non-posted memory write transaction to a memory and a Peripheral Component Interconnect (PCI)-based fabric including control logic to direct the non-posted memory write transaction to the memory, receive a completion for the non-posted memory write transaction from the memory and route the completion to the first endpoint. Other embodiments are described and claimed.

26 Claims, 11 Drawing Sheets

(51) Int. Cl.
  *G06F 15/78* (2006.01)
  *G06F 15/76* (2006.01)

(56) References Cited

U.S. PATENT DOCUMENTS

| | | | |
|---|---|---|---|
| 6,233,632 B1 | 5/2001 | Meiyappan et al. |
| 6,330,647 B1 | 12/2001 | Jeddeloh et al. |
| 6,427,169 B1 | 7/2002 | Elzur |
| 6,430,182 B1 | 8/2002 | Oyama |
| 6,469,982 B1 | 10/2002 | Henrion et al. |
| 6,611,893 B1 | 8/2003 | Lee et al. |
| 6,694,380 B1 | 2/2004 | Wolrich et al. |
| 6,725,313 B1 | 4/2004 | Wingard et al. |
| 6,810,460 B1 | 10/2004 | Kirkwood |
| 6,816,938 B2 | 11/2004 | Edara et al. |
| 7,028,130 B2 | 4/2006 | Lueck |
| 7,065,733 B2 | 6/2006 | Goodnow et al. |
| 7,415,533 B1 | 9/2008 | Lacroute et al. |
| 7,421,543 B2 | 9/2008 | Suzuki |
| 7,457,905 B2 | 11/2008 | Gehman |
| 7,506,089 B2 | 3/2009 | Cho et al. |
| 7,573,295 B1 | 8/2009 | Stadler |
| 7,613,902 B1 | 11/2009 | Martin et al. |
| 7,673,087 B1 | 3/2010 | Ansari et al. |
| 7,685,346 B2 | 3/2010 | Teh |
| 7,723,902 B2 | 5/2010 | Mandhani et al. |
| 7,734,856 B2 | 6/2010 | Reinig |
| 7,783,819 B2 | 8/2010 | Mandhani |
| 7,793,345 B2 | 9/2010 | Weber et al. |
| 7,873,068 B2 | 1/2011 | Klinglesmith et al. |
| 7,970,970 B2 | 6/2011 | Subramanian |
| 7,979,592 B1 | 7/2011 | Pettey et al. |
| 7,990,999 B2 | 8/2011 | Lee |
| 8,010,731 B2 | 8/2011 | Mandhani |
| 8,023,508 B2 | 9/2011 | Horton |
| 8,069,286 B1 | 11/2011 | Orthner et al. |
| 8,199,157 B2 | 6/2012 | Park et al. |
| 8,225,019 B2 | 7/2012 | Asnaashari |
| 8,286,014 B2 | 10/2012 | Han et al. |
| 8,364,874 B1 | 1/2013 | Schlansker et al. |
| 8,437,369 B2 | 5/2013 | Shaikli |
| 8,443,422 B2 | 5/2013 | Weber et al. |
| 8,711,875 B2 | 4/2014 | Lakshmanamurthy |
| 8,713,234 B2 | 4/2014 | Lakshmanamurthy |
| 8,713,240 B2 | 4/2014 | Lakshmanamurthy |
| 8,775,700 B2 | 7/2014 | Lakshmanamurthy |
| 8,805,926 B2 | 8/2014 | Lakshmanamurthy |
| 8,874,976 B2 | 10/2014 | Lakshmanamurthy |
| 8,929,373 B2 | 1/2015 | Lakshmanamurthy |
| 8,930,602 B2 | 1/2015 | Lakshmanamurthy |
| 9,021,156 B2 | 4/2015 | Lakshmanamurthy |
| 9,053,251 B2 | 6/2015 | Lakshmanamurthy |
| 9,910,816 B2 * | 3/2018 | Egi ............... G06F 13/4282 |
| 9,996,487 B2 * | 6/2018 | Niell ............. G06F 12/0831 |
| 10,037,284 B2 * | 7/2018 | Luo .................. G06F 13/32 |
| 10,191,867 B1 * | 1/2019 | Stark ............. G06F 13/1673 |
| 2002/0038401 A1 | 3/2002 | Zaidi |
| 2003/0088722 A1 | 5/2003 | Price |
| 2003/0126336 A1 | 7/2003 | Creta |
| 2003/0227926 A1 | 12/2003 | Ramamurthy et al. |
| 2004/0177176 A1 | 9/2004 | Li et al. |
| 2004/0218600 A1 | 11/2004 | Mehdi et al. |
| 2005/0010687 A1 | 1/2005 | Donglai |
| 2005/0038948 A1 | 2/2005 | Lueck et al. |
| 2005/0120323 A1 | 6/2005 | Goodnow et al. |
| 2005/0137966 A1 | 6/2005 | Munguia et al. |
| 2005/0177664 A1 | 8/2005 | Cho et al. |
| 2005/0289369 A1 | 12/2005 | Chung et al. |
| 2005/0289374 A1 | 12/2005 | Kim et al. |
| 2006/0047849 A1 | 3/2006 | Mukherjee |
| 2006/0101179 A1 | 5/2006 | Lee et al. |
| 2006/0140126 A1 | 6/2006 | Zhong |
| 2006/0218336 A1 | 9/2006 | Ishizawa et al. |
| 2007/0006108 A1 | 1/2007 | Bueti |
| 2007/0067549 A1 | 3/2007 | Gehman |
| 2008/0059441 A1 | 3/2008 | Gaug et al. |
| 2008/0082840 A1 | 4/2008 | Kendall et al. |
| 2008/0147858 A1 | 6/2008 | Prakash et al. |
| 2008/0163005 A1 | 7/2008 | Sonksen et al. |
| 2008/0235415 A1 | 9/2008 | Clark et al. |
| 2008/0288689 A1 | 11/2008 | Hoang |
| 2008/0310458 A1 | 12/2008 | Rijpkema |
| 2009/0006165 A1 | 1/2009 | Teh et al. |
| 2009/0119432 A1 | 5/2009 | Lee et al. |
| 2009/0235099 A1 | 9/2009 | Branover et al. |
| 2009/0248940 A1 | 10/2009 | Marino et al. |
| 2009/0249098 A1 | 10/2009 | Han et al. |
| 2009/0296624 A1 | 12/2009 | Ryu et al. |
| 2009/0296740 A1 | 12/2009 | Wagh |
| 2009/0300245 A1 | 12/2009 | Shoemaker et al. |
| 2009/0310616 A1 | 12/2009 | Cummings et al. |
| 2010/0199010 A1 | 8/2010 | Goren et al. |
| 2010/0022070 A1 | 9/2010 | Farrugia et al. |
| 2010/0220703 A1 | 9/2010 | Farrugia et al. |
| 2010/0235675 A1 | 9/2010 | Subramanian et al. |
| 2010/0246594 A1 | 9/2010 | Klinglesmith et al. |
| 2010/0262855 A1 | 10/2010 | Buch et al. |
| 2010/0278195 A1 | 11/2010 | Wagh |
| 2010/0293304 A1 | 11/2010 | Alexandron et al. |
| 2010/0312942 A1 | 12/2010 | Blinick et al. |
| 2011/0032947 A1 | 2/2011 | Brueggen |
| 2011/0047272 A1 | 2/2011 | Bosneag |
| 2011/0078315 A1 | 3/2011 | Matsushita et al. |
| 2011/0078356 A1 | 3/2011 | Shoemaker |
| 2011/0093576 A1 | 4/2011 | Cherian et al. |
| 2011/0179248 A1 | 7/2011 | Lee |
| 2011/0238728 A1 | 9/2011 | Nagarajao et al. |
| 2012/0051297 A1 | 3/2012 | Lee et al. |
| 2012/0066468 A1 | 3/2012 | Nakajima et al. |
| 2012/0079590 A1 * | 3/2012 | Sastry ............. G06F 12/1458 726/21 |
| 2012/0233514 A1 | 9/2012 | Patil et al. |
| 2012/0303842 A1 | 11/2012 | Cardinell et al. |
| 2012/0303899 A1 | 11/2012 | Ash et al. |
| 2012/0311213 A1 | 12/2012 | Bender et al. |
| 2013/0054845 A1 | 2/2013 | Nimmala et al. |
| 2013/0089095 A1 | 4/2013 | Chen et al. |
| 2013/0166812 A1 | 6/2013 | Boucard et al. |
| 2014/0189187 A1 * | 7/2014 | Acharya ........... G06F 13/385 710/310 |
| 2015/0019788 A1 | 1/2015 | Adler et al. |
| 2015/0103826 A1 | 4/2015 | Davis |
| 2015/0113189 A1 | 4/2015 | Lakshmanamurthy et al. |

FOREIGN PATENT DOCUMENTS

| | | |
|---|---|---|
| CN | 101558589 | 10/2009 |
| CN | 101873339 | 10/2010 |
| EP | 1328104 | 7/2003 |
| EP | 2216722 | 8/2010 |
| GB | 2405052 | 2/2005 |
| JP | 2007-135035 | 5/2007 |
| KR | 10-2005-0077437 | 8/2005 |
| KR | 10-2005-0082834 | 8/2005 |
| WO | 0119081 | 3/2001 |
| WO | 03032584 | 4/2003 |
| WO | 2005071553 | 8/2005 |
| WO | 2010102055 | 9/2010 |
| WO | 2010137572 | 12/2010 |
| WO | 2013071892 | 5/2013 |

OTHER PUBLICATIONS

U.S. Appl. No. 15/383,032, filed Dec. 19, 2016, entitled "Method, Apparatus and System for Hierarchical Network On Chip Routing," by Robert P. Adler, et al.

Intel Corporation, "An Introduction to the Intel QuickPath Interconnect," Jan. 2009, pp. 1-22.

Sousek, et al., "PCI Express Core Integration with the OCP Bus," CAST, Inc. 2006, 15 pages.

Mentor Graphics, "PCI Express to AMBA 3 AXI Bridge IP," Mentor Graphics, Jun. 2007, 2 pages.

(56) References Cited

OTHER PUBLICATIONS

Everton Carara, et al., "Communication Models in Networks-on-Chip," 18th IEEE/IFIP International Workshop on Rapid System Prototyping (RSP '07), 2007, pp. 57-60.
PCI-SIG, "PCI Local Bus Specification, Revision 3.0,"Feb. 3, 2004, 3 pages.

* cited by examiner

METHOD, APPARATUS AND SYSTEM FOR HANDLING NON-POSTED MEMORY WRITE TRANSACTIONS IN A FABRIC

This application is a continuation of U.S. patent application Ser. No. 15/391,984, filed Dec. 28, 2016, the content of which is hereby incorporated by reference.

TECHNICAL FIELD

Embodiments relate to communications and more particularly to communications in an integrated circuit.

BACKGROUND

Mainstream processor chips, both in high performance and low power segments, are increasingly integrating additional functionality such as graphics, display engines, security engines, and so forth. Such designs are highly segmented due to varying requirements from the server, desktop, mobile, embedded, ultra-mobile and mobile Internet device segments. Different markets seek to use single chip system-on-chip (SoC) solutions that combine at least some of processor cores, memory controllers, input/output controllers and other segment specific acceleration elements onto a single chip. However, designs that accumulate these features are slow to emerge due to the difficulty of integrating different intellectual property (IP) blocks on a single die. This is especially so, as IP blocks can have various requirements and design uniqueness, and can require many specialized wires, communication protocols and so forth to enable their incorporation into an SoC. As a result, each SoC or other advanced semiconductor device that is developed requires a great amount of design complexity and customization to incorporate different IP blocks into a single device. This is so, as a given IP block typically needs to be re-designed to accommodate interface and signaling requirements of a given SoC.

Many computer systems and even integrated circuits within such systems incorporate Peripheral Component Interconnect (PCI) technologies that provide rules for communication of transactions and various protocols for handling data flows within the system. In a PCI-ordered interconnect, producer-consumer (P/C) flows are handled with a couple of well-defined semantics. Most notably, these semantics include: (1) writes from a producer are always posted, in that such writes are considered complete when sent by the source without receipt of an express acknowledgement (also referred to as a fire and forget transaction); and (2) the system ensures that writes have been handled to the point of global observation before a consumer consumes the data. These semantics enable functional correctness of a PCI-ordered interconnect. While this arrangement works well, difficulties arise when non-PCI-based devices are incorporated into systems with PCI-ordered interconnects, in that substantial complexity may arise in ensuring these semantics are met.

DETAILED DESCRIPTION

Figure 1:
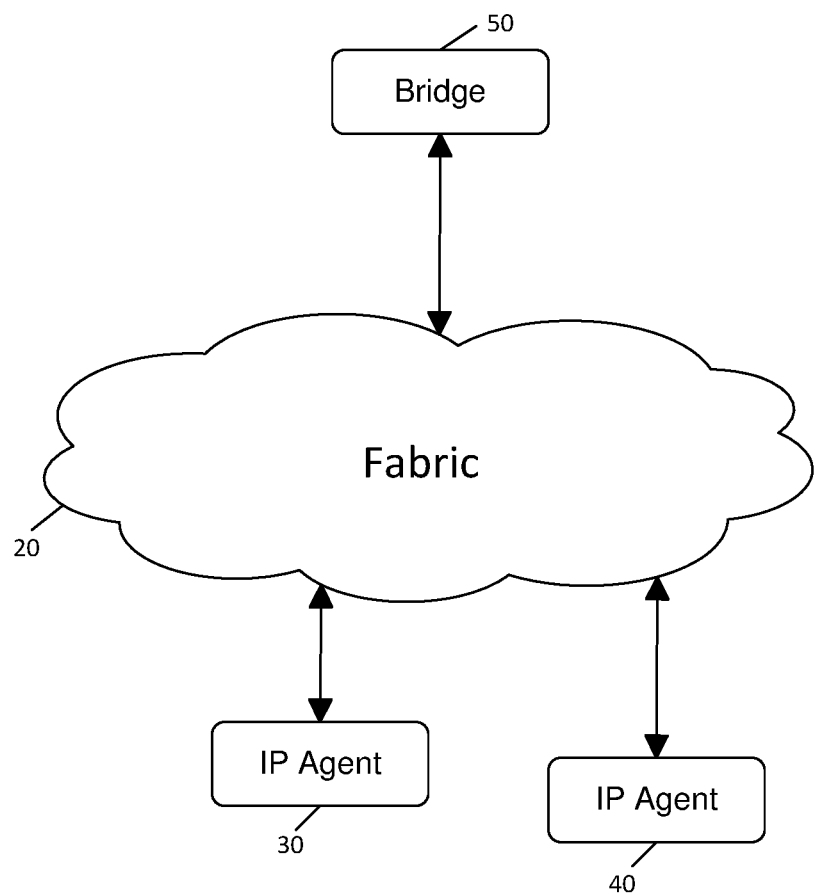
FIG. 1 is a block diagram of a basic interconnect architecture in accordance with an embodiment of the present invention.

In various embodiments, integrated circuits such as processors, systems on chip (SoC), among others that implement communication techniques in accordance with a Peripheral Component Interconnect (PCI)-based protocol are configured to enable additional transaction mechanisms, namely non-posted memory write transactions, within these devices. This is so, although no PCI specification supports the concept of a non-posted memory write transaction. Note that in embodiments described herein, certain fabrics and devices such as endpoints within an SoC may be configured to accommodate and handle these non-posted memory write transactions. However, many other components such as other fabric instantiations, endpoints and other devices of a legacy variety may not be configured for handling these transactions. Understand that a non-posted memory write transaction is a transaction that is sent by a source and destined to a destination memory or other storage that is not considered complete by the source until the source receives an acknowledgement, e.g., in the form of a completion that does not include data, to indicate that the data of the transaction has been globally observed.

Note that as used herein, the terms "PCI," "PCI-based" or "PCI-compliant" refer to components such as devices, fabrics, endpoints and so forth that are compatible with one or more PCI specifications including, as examples, a PCI Local Bus Specification Rev. 3.0 (dated Feb. 3, 2004) and/or a PCI-Express (PCIe) Base Specification, Rev. 3.1a (dated Dec. 7, 2015), and support transaction ordering rules of such PCI specifications. And more specifically, such PCI-compliant fabrics are thus "PCI-ordered fabrics." In turn as used herein, the terms "non-PCI," "non-PCI-based" or "non-PCI compliant" are used to refer to components that are not compatible with such specifications and do not comply with ordering rules of such specifications. And thus more specifically, these non-PCI fabrics are not PCI-ordered fabrics. As examples, non-PCI devices may include devices that are designed for compatibility with other communication protocols including advanced microcontroller bus architecture (AMBA)-type protocols such as an advanced extensible interface (AXI), an open core protocol (OCP) or other proprietary or non-proprietary protocols. For example, fabrics of vendors such as Arteris and Sonics may be considered to be non-PCI fabrics.

In various embodiments, a PCI-ordered system is configured to support P/C ordering across multiple channels by enabling a non-posted write transaction type to be supported on a primary interface of a fabric. The non-posted write transaction complies with all PCI ordering rules and provides explicit acknowledgement semantics (e.g., via a completion without data) required by a non-posted write transaction. Such a non-posted write transaction provides scalability of ensuring P/C correctness across all channels in a PCI-ordered fabric, without any additional capabilities in the rest of the system. Understand also that non-posted memory transactions described herein are for bulk data writes. Such write transactions stand in contrast to input/output write (IOWr) and configuration write (CfgWr) transactions that are non-posted. However, these other non-posted transactions fundamentally write different spaces (not memory) and are limited to a single double word (DW) in size. Memory transactions as described herein, in contrast, can be up to the full PCI maximum payload size of 1024DW.

By supporting non-posted write transaction semantics within a primary interface of a fabric, non-posted write transactions from a non-PCI-based, intellectual property (IP) logic can be mapped directly to a non-posted write on the primary interface. If the non-PCI IP logic uses multiple channels, all such channels are mapped 1:1 on the primary interface, without any additional custom changes. As a result, non-PCI-based IP logics may be integrated natively and naturally into a fabric that supports non-posted writes. Non-posted write transactions may also simplify P/C handshaking for traditional PCI-compliant IP logics that use multiple channels for quality of service (QoS). In some embodiments, supporting this non-posted write semantic in a fabric simplifies the overall logic complexity by eliminating custom cross-channel handshaking techniques.

Embodiments can be used in many different types of systems. As examples, implementations described herein may be used in connection with semiconductor devices such as processors or other semiconductor devices that can be fabricated on a single semiconductor die. In particular implementations, the device may be a system-on-chip (SoC) or other advanced processor or chipset that includes various homogeneous and/or heterogeneous processing agents, and additional components such as networking components, e.g., routers, controllers, bridge devices, devices, memories and so forth.

Some implementations may be used in a semiconductor device that is designed according to a given specification such as an integrated on-chip system fabric (IOSF) specification issued by a semiconductor manufacturer such as Intel Corporation to provide a standardized on-die interconnect protocol for attaching intellectual property (IP) blocks within a chip, including a SoC. Such IP blocks can be of varying types, including general-purpose processors such as in-order or out-of-order cores, fixed function units, graphics processors, IO controllers, display controllers, media processors among many others. By standardizing an interconnect protocol, a framework is thus realized for a broad use of IP agents in different types of chips. Accordingly, not only can the semiconductor manufacturer efficiently design different types of chips across a wide variety of customer segments, it can also, via the specification, enable third parties to design logic such as IP agents to be incorporated in such chips. And furthermore, by providing multiple options for many facets of the interconnect protocol, reuse of designs is efficiently accommodated. Although embodiments are described herein in connection with this IOSF specification, understand the scope of the present invention is not limited in this regard and embodiments can be used in many different types of systems.

Referring now to FIG. 1, shown is a block diagram of a basic interconnect architecture in accordance with an embodiment of the present invention. As shown in FIG. 1, system 10 may be a portion of a system-on-chip or any other semiconductor device such as a highly integrated processor complex or an integrated IO hub, and includes a fabric 20 that acts as an interconnect between various components. In the implementation shown, these components include IP agents 30 and 40, which can be independent IP blocks to provide various functionality such as compute capabilities, graphics capabilities, media processing capabilities and so forth. These IP agents are thus IP blocks or logical devices having an interface that is compliant with the IOSF specification, in one embodiment. As further seen, fabric 20 also interfaces to a bridge 50. Although not shown for ease of illustration in the embodiment of FIG. 1, understand that bridge 50 may act as an interface to other system components, e.g., on the same chip or on one or more different chips.

As will be described further below, each of the elements shown in FIG. 1, namely the fabric, the IP agents, and the bridge may include one or more interfaces to handle communication of various signals. These interfaces may be defined according to the IOSF specification, which defines signals for communication on these interfaces, protocols used for information exchange between agents, arbitration and flow control mechanisms used to initiate and manage information exchange, supported address decoding and translation capabilities, messaging for in-band or out-of-band communication, power management, test, validation and debug support.

The IOSF specification includes 3 independent interfaces that can be provided for each agent, namely a primary interface, a sideband message interface and a testability and debug interface (design for test (DFT), design for debug (DFD) interface). According to the IOSF specification, an agent may support any combination of these interfaces. Specifically, an agent can support 0-N primary interfaces, 0-N sideband message interfaces, and optional DFx interfaces. However, according to the specification, an agent must support at least one of these 3 interfaces.

Figure 2:
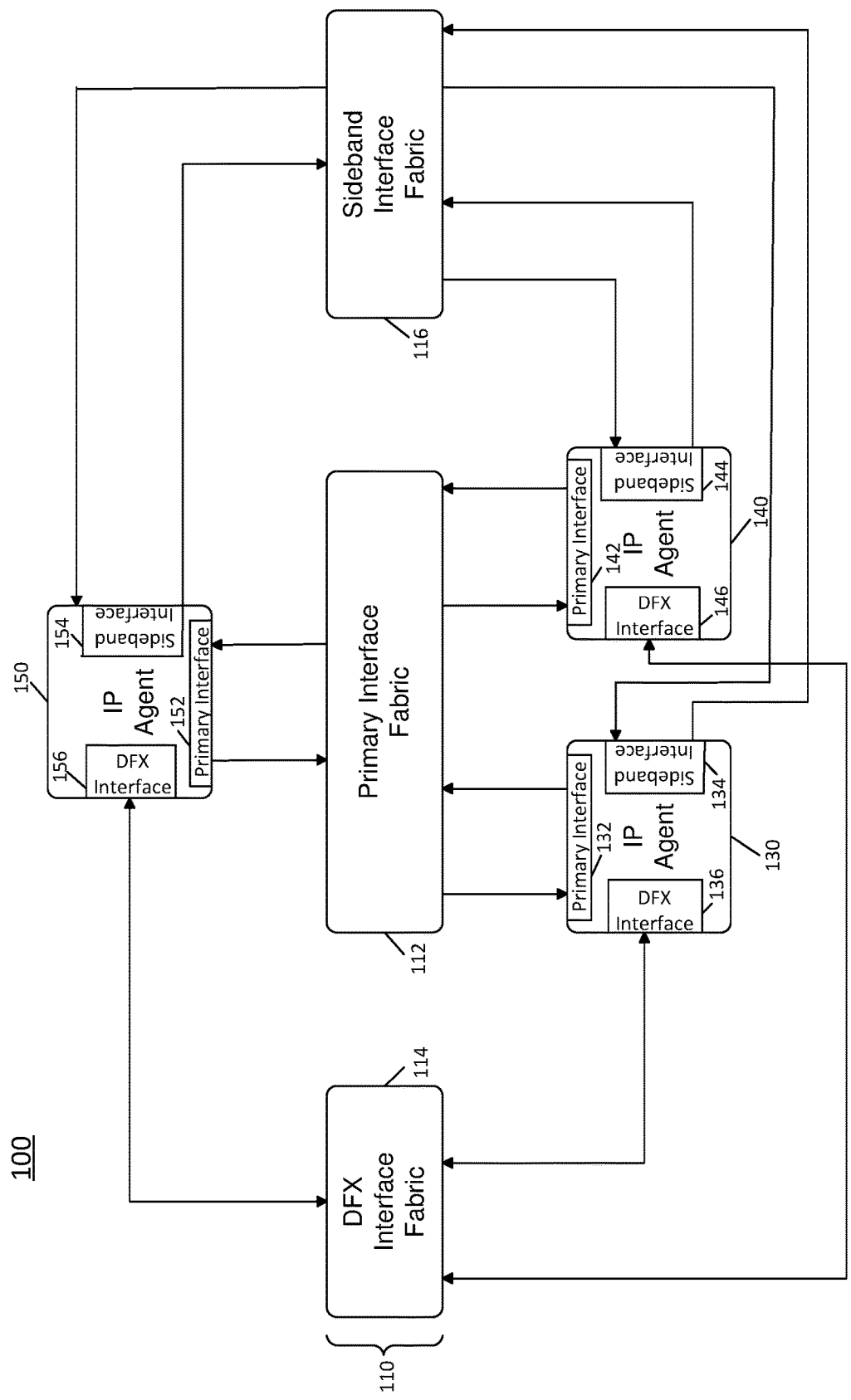
FIG. 2 is a block diagram of further details of an interconnect architecture in accordance with an embodiment of the present invention.

Fabric 20 may be a hardware element that moves data between different agents. Note that the topology of fabric 20 will be product specific. As examples, a fabric can be implemented as a bus, a hierarchical bus, a cascaded hub or so forth. Referring now to FIG. 2, shown is a block diagram of further details of an interconnect architecture in accordance with an embodiment of the present invention. As shown in FIG. 2, the IOSF specification defines three distinct fabrics, namely a primary interface fabric 112, a DFx fabric 114, and a sideband fabric 116. Primary interface fabric 112 is used for all in-band communication between agents and memory, e.g., between a host processor such as a central processing unit (CPU) or other processor and an agent. Primary interface fabric 112 may further enable communication of peer transactions between agents and supported fabrics. All transaction types including memory, input output (IO), configuration, and in-band messaging can be delivered via primary interface fabric 112. Thus the primary interface fabric may act as a high performance interface for data transferred between peers and/or communications with upstream components.

In various implementations, primary interface fabric 112 implements a split transaction protocol to achieve maximum concurrency. That is, this protocol provides for a request phase, a grant phase, and a command and data phase. Primary interface fabric 112 supports three basic request types: posted, non-posted, and completions, in various embodiments. Generally, a posted transaction is a transaction which when sent by a source is considered complete by the source and the source does not receive a completion or other confirmation message regarding the transaction. One such example of a posted transaction may be a write transaction. In contrast, a non-posted transaction is not considered completed by the source until a return message is received, namely a completion. One example of a non-posted transaction is a read transaction in which the source agent requests a read of data. Accordingly, the completion message provides the requested data.

In addition, primary interface fabric 112 supports the concept of distinct channels to provide a mechanism for independent data flows throughout the system. As will be described further, primary interface fabric 112 may itself include a master interface that initiates transactions and a target interface that receives transactions. The primary master interface can further be sub-divided into a request interface, a command interface, and a data interface. The request interface can be used to provide control for movement of a transaction's command and data. In various embodiments, primary interface fabric 112 may support PCI ordering rules and enumeration.

In turn, sideband interface fabric 116 may be a standard mechanism for communicating all out-of-band information. In this way, special-purpose wires designed for a given implementation can be avoided, enhancing the ability of IP reuse across a wide variety of chips. Thus in contrast to an IP block that uses dedicated wires to handle out-of-band communications such as status, interrupt, power management, fuse distribution, configuration shadowing, test modes and so forth, a sideband interface fabric 116 according to the IOSF specification standardizes all out-of-band communication, promoting modularity and reducing validation requirements for IP reuse across different designs. In general, sideband interface fabric 116 may be used to communicate non-performance critical information, rather than for performance critical data transfers, which typically may be communicated via primary interface fabric 112.

As further illustrated in FIG. 2, IP agents 130, 140, and 150 may each include a corresponding primary interface, a sideband interface and a DFx interface. However, as discussed above, each agent need not include every one of these interfaces, and a given IP agent may include only a single interface, in some embodiments.

Figure 3:
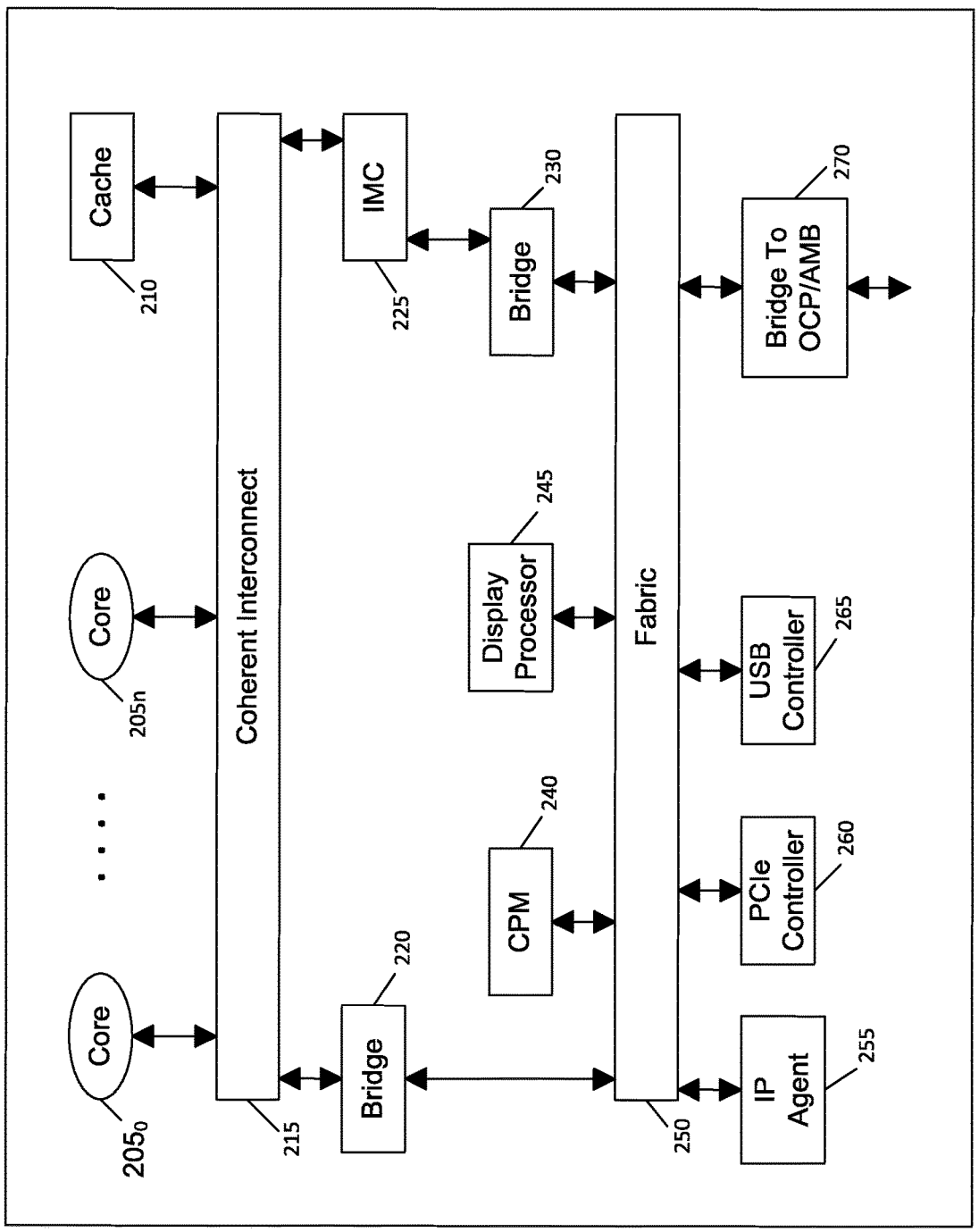
FIG. 3 is a high level block diagram of a SoC in accordance with an embodiment of the present invention.

Using an IOSF specification, various types of chips can be designed having a wide variety of different functionality. Referring now to FIG. 3, shown is a high level block diagram of a SoC in accordance with an embodiment of the present invention. As shown in FIG. 3, SoC 200 may include various components, all of which can be integrated on a single semiconductor die to provide for various processing capabilities at high speeds and low power, consuming a comparatively small amount of real estate. As seen in FIG. 3, SoC 200 includes a plurality of cores $205_0$-$205_n$. In various embodiments, cores 205 can be relatively simple in-order cores or more complex out-of-order cores. Or a combination of in-order and out-of-order cores can be present in a single SoC. As seen, cores 205 can be interconnected via a coherent interconnect 215, which further couples to a cache memory 210, e.g., a shared last level cache (LLC). Although the scope of the present invention is not limited in this regard, in one embodiment coherent interconnect 215 may be in accordance with the Quick Path Interconnect (QPI)™ specification available from Intel Corporation, Santa Clara, Calif.

As further seen in FIG. 3, coherent interconnect 215 may communicate via a bridge 220 to a fabric 250, which may be an IOSF fabric. Coherent interconnect 215 may further communicate via an integrated memory controller 215 to an off-chip memory (not shown for ease of illustration the embodiment of FIG. 3), and further through bridge 230 to fabric 250.

As further seen in FIG. 3, various components can couple to fabric 250 including a content processing module (CPM) 240 which can be used for performing various operations such as security processing, cryptographic functions and so forth. In addition, a display processor 245 can be part of a media processing pipeline that renders video for an associated display.

As further seen, fabric 250 may further couple to an IP agent 255. Although only a single agent is shown for ease of illustration in the FIG. 3 embodiment, understand that multiple such agents are possible in different embodiments. In addition, to enable communication with other on-chip devices, fabric 250 may further communicate with a PCIe™ controller 260 and a universal serial bus (USB) controller 265, both of which can communicate with various devices according to these protocols. Finally, shown in the embodiment of FIG. 3 is a bridge 270, which can be used to communicate with additional components of other protocols, such as an OCP or an AMBA protocol. Although shown with these particular components in the embodiment of FIG. 3, understand that the scope of the present invention is not limited in this way and in different embodiments additional or different components may be present.

Figure 4:
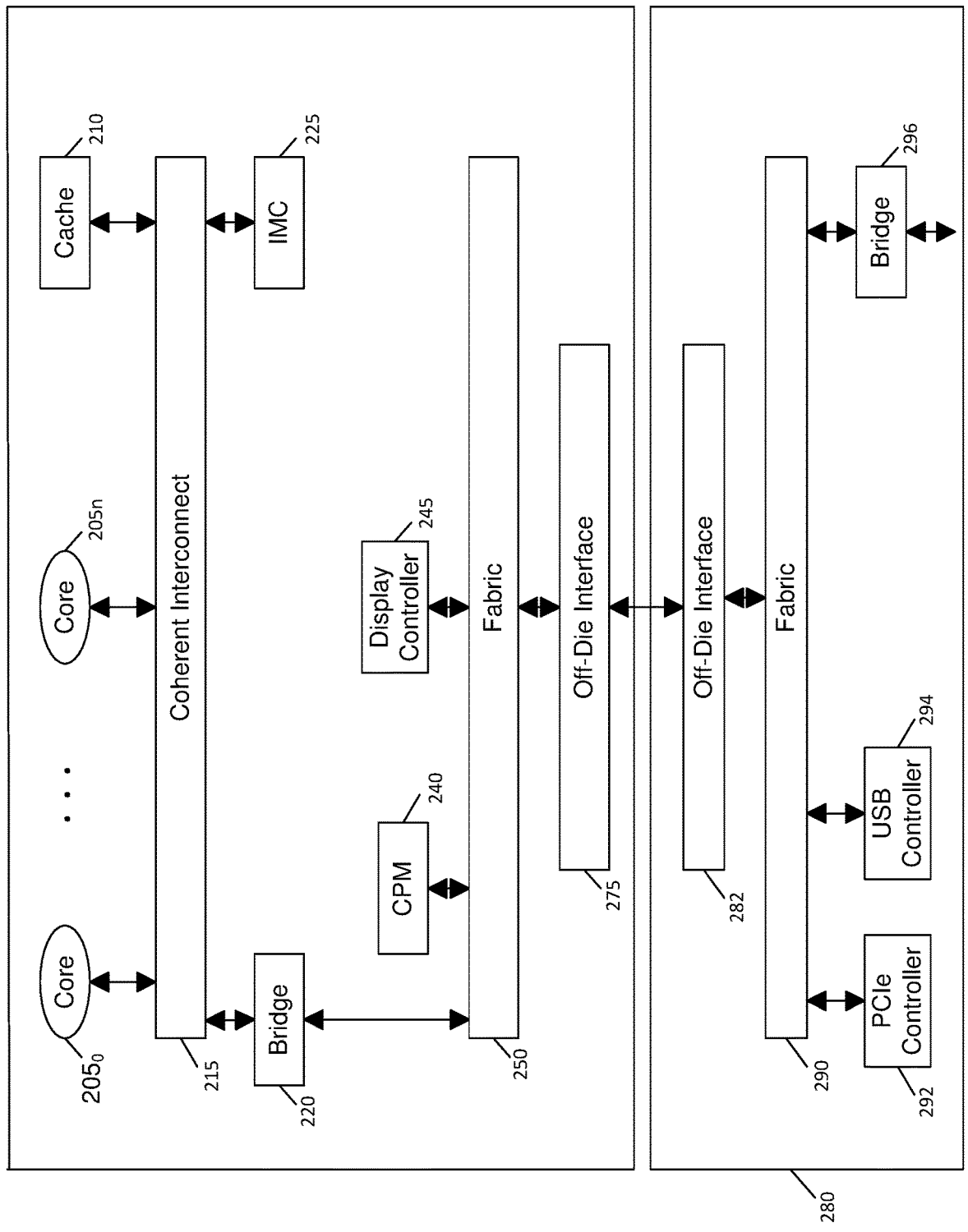
FIG. 4 is a block diagram of a system in accordance with another embodiment of the present invention.

Furthermore, understand that while shown as a single die SoC implementation in FIG. 3, embodiments can further be implemented in a system in which multiple chips communicate with each other via a non-IOSF interface. Referring now to FIG. 4, shown is a block diagram of a system in accordance with another embodiment of the present invention. As shown in FIG. 4, the system may include a SoC 200', which may include many components similar to those discussed above with regard to FIG. 3, and an additional off-die interface 275. Accordingly, SoC 200' can communicate with another chip 280 which may include various functionality to enable communication between these two chips, as well as to various off-chip devices such as different peripherals according to one or more different specifications. Specifically, a second chip 280 is shown to include an off-die interface 282 to enable communication with SoC 200', and which in turn communicates with a fabric 290, which may be an IOSF fabric according to an embodiment of the present invention. As seen, fabric 290 may further be coupled to various controllers in communication with off-chip devices, including a PCIe™ controller 292, a USB controller 294, and a bridge 296.

Figure 5:
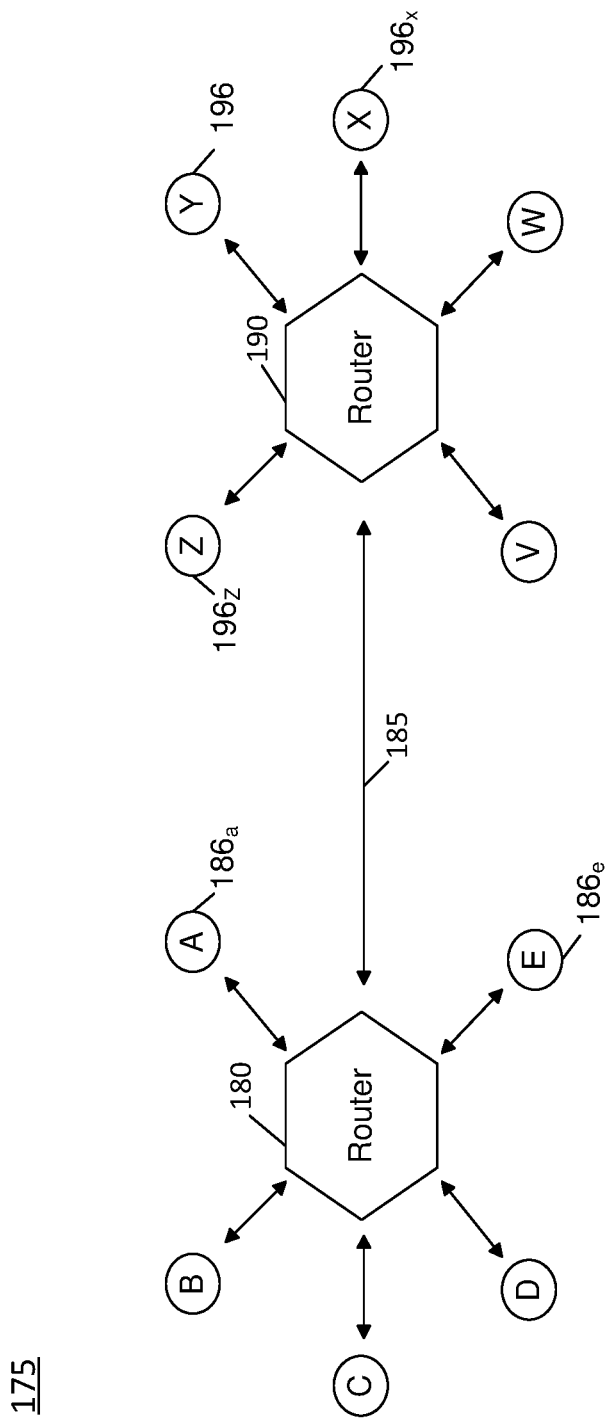
FIG. 5 is a block diagram of a sideband interconnection in accordance with an embodiment of the present invention.

As discussed above, in various embodiments all out-of-band communications may be via a sideband message interface. Referring now to FIG. 5, shown is a block diagram of a sideband interconnection in accordance with an embodiment of the present invention. As shown in FIG. 5, sideband interface system 175 includes multiple routers 180 and 190, which are shown in the embodiment of FIG. 5 as being coupled via a point-to-point (PTP) interconnect 185. In turn, each router can be coupled to various endpoints, which can be, for example, IP agents or other components of a given system. Specifically, router 180 couples to a plurality of endpoints 186*a*-186*e* and router 190 couples to a plurality of endpoints 196*x*-196*z*.

Figure 6:
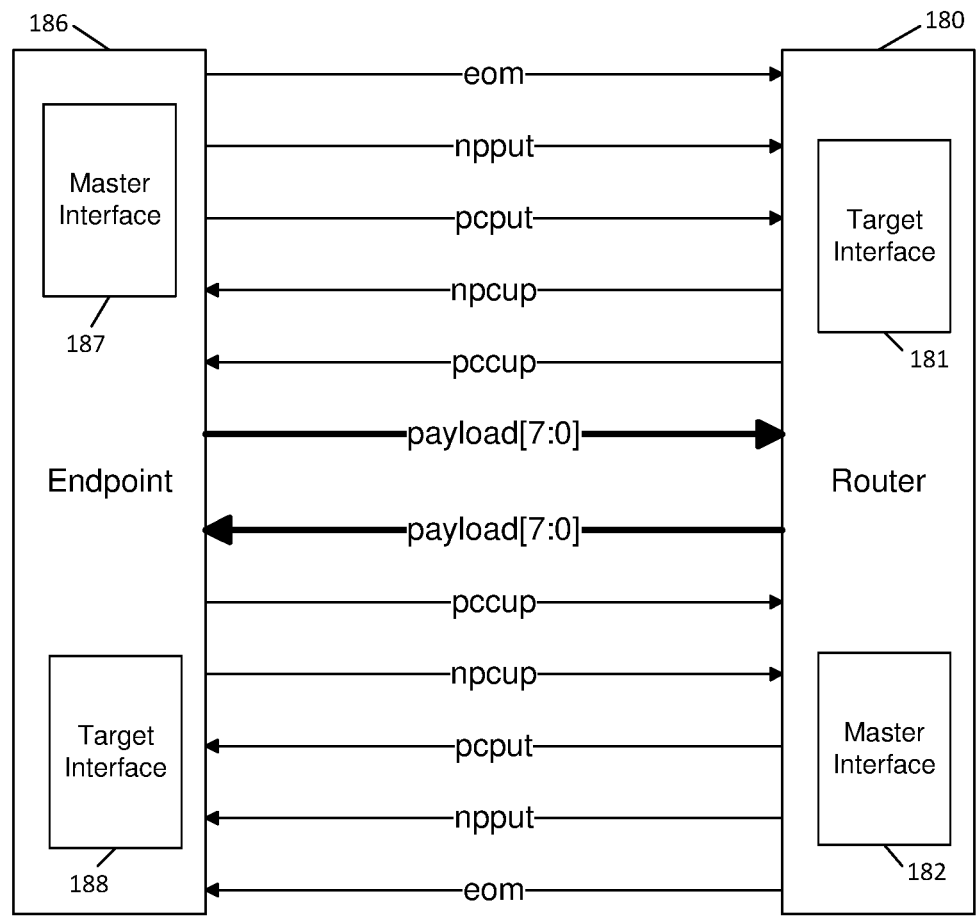
FIG. 6 is a block diagram of details of signaling available for a sideband interface in accordance with an embodiment of the present invention

Referring now to FIG. 6, shown is a block diagram of details of signaling available for a sideband interface in accordance with an embodiment of the present invention. As shown in FIG. 6, interconnection between a router 180 and an endpoint 186 is shown. As seen, router 180 may include a target interface 181 and a master interface 182. In general, target interface 181 may be configured to receive incoming signals, while master interface 182 may be configured to transmit outgoing signals. As seen, endpoint 186 also includes a master interface 187 and a target interface 188.

FIG. 6 further shows details of the various signaling available for the sideband interface, including credit information, put information, end of message signaling, and data. Specifically, credit updates can be communicated via sideband interfaces as a non-posted credit update signal (NP-CUP) and a posted credit update signal (PCCUP). In addition, put signals may be provided (NPPUT and PCPUT). In addition, an end of message (EOM) signal can be communicated. Finally, data may be communicated via payload packets which in one embodiment can be implemented via a byte-wide communication channel. Although shown with this particular implementation in the embodiment of FIG. 6, the scope of the present invention is not limited in this regard. Whenever a credit Put signal is high, this means that a credit is being returned. Whenever a put signal is high, it means that the payload (e.g., data) signal is valid. Whenever a Put and EOM are high at the same time, it means that the current payload is the last payload of the message. Note that the interface can both "put" a data payload and "put" a credit in the same clock cycle.

In one embodiment, non-posted write transaction types may include different addressing modes, including a 32-bit address non-posted memory write request (NPMWr32) and a 64-bit address non-posted memory write request (NPMWr64). These non-posted writes may be configured to use a non-posted flow request type, and will return a single completion (CPL) without data as a response.

In some embodiments, multiple outstanding non-posted write requests may be allowed. If any ordering is required between posted and non-posted writes, an agent may be configured to wait for all completions for outstanding non-posted memory write requests before issuing any posted write request. This semantic ensures write-data consistency, as according to ordering rules, posted writes may overtake non-posted writes. Non-posted memory writes may follow the same ordering rules as any other non-posted request, and also follow the same rules as any other memory transaction.

In an embodiment, non-posted writes may only be sent from a root complex if directed towards a non-PCI-based fabric or device. In all other PCI-based fabrics such as a PCIe switch fabric or an integrated device fabric, the non-posted write is not supported. In this case, a non-posted write transaction that is to be routed to a PCI-based fabric that does not support a non-posted write may be converted or terminated by a root complex or other non-posted write transaction-aware fabric.

For example, if an agent gives access to a conventional root complex integrated endpoint that does not support non-posted memory write requests, a fabric may simply return an unsupported request completion. No changes to an existing agent occur, because an error handler in a primary fabric can handle this completion.

In another example, an agent may give access to a fabric that does not support non-posted memory writes. For example where a PCIe root port may give access to a PCIe hierarchy, a virtual root port may give access to an integrated device fabric or a legacy primary fabric that does not support non-posted memory writes, a bridge agent may map the non-posted memory write transaction to a posted memory write transaction (e.g., MWr32 or MWr64), and generate a completion to send to the original requester. This ensures interoperability and backwards compatibility.

Using embodiments, third party non-PCI-based IP logics may be more readily and flexibly integrated into PCI-based clients, servers, and devices. In addition embodiments may also simplify the design of PCI-ordered fabrics that implement P/C ordering on multiple channels. With non-posted write transactions being defined and supported for all channels within supported fabrics and devices, IP logics with additional virtual channels for QoS do not have to add any extra handshaking to ensure correct handling. As such, embodiments described herein provide a non-posted write transaction capability that is a naturally scalable mechanism for P/C ordering across any channel. As a result, embodiments may enhance scalability by supporting both PCI and non-PCI IP logics that may implement sophisticated QoS mechanisms.

Embodiments may provide ordering rules that support non-posted write transactions, as based on PCI ordering rules. For Table 1 below, the columns represent a first issued transaction and the rows represent a subsequently issued transaction. The table entry indicates the ordering relationship between the two transactions.

TABLE 1

| | | Non-Posted Request | | | |
|---|---|---|---|---|---|
| | Row Pass Column? | Posted Request (Col 2) | Read Request Write Request (Col 3) | NPR with Data (Col 4) | Completion (Col 5) |
| Non-Posted Request | Posted Request (Row A) | a) No b) Y/N | Yes | Yes | a) Y/N b) Yes |
| | Read Request Write Request (Row B) | a) No b) Y/N | Y/N | Y/N | Y/N |
| | NPR with Data (Row C) | a) No b) Y/N | Y/N | Y/N | Y/N |
| | Completion (Row D) | a) No b) Y/N | Yes | Yes | a) Y/N b) No |

In Table 1: a Posted Request is a Memory Write Request or a Message Request; a Non-Posted Read Request is a Configuration Read Request, an I/O Read Request, or a Memory Read Request; a Non-Posted Write Request is a Memory Write Request; an NPR (Non-Posted Request) with Data is a Configuration Write Request, an I/O Write Request, or an AtomicOp Request; a Non-Posted Request is a Read Request or an NPR with Data.

Each table entry indicates the ordering relationship between the two transactions. The table entries are defined as follows: (1) Yes—the second transaction (row) must be allowed to pass the first (column) to avoid deadlock. When blocking occurs, the second transaction is required to pass the first transaction. Fairness is comprehended to prevent starvation. A message is blocked if there are no credits for that message type; (2) No—the second transaction (row) must not be allowed to pass the first (column) transaction; and (3) Y/N—There are no requirements, such that the second transaction may optionally pass the first transaction.

Table 2 below provides an explanation of each entry in the above Table 1.

TABLE 2

| | |
|---|---|
| A2a | A Posted Request must not pass another Posted Request unless A2b applies. |
| A2b | A Posted Request with RO Set is permitted to pass another Posted Request. A Posted Request with IDO Set is permitted to pass another Posted Request if the two Requester IDs are different. |
| A3, A4 | A Posted Request must be able to pass Non-Posted Requests to avoid deadlocks. |
| A5a | A Posted Request is permitted to pass a Completion, but is not required to be able to pass Completions unless A5b applies. |
| A5b | Inside a PCI Express to PCI/PCI-X Bridge whose PCI/PCI-X bus segment is operating in a conventional PCI mode, for transactions traveling in the PCI Express to PCI direction, a Posted Request must be able to pass Completions to avoid deadlock. |
| B2a | A Read or Write Request must not pass a Posted Request unless B2b applies. |
| B2b | A Read or Write Request with IDO Set is permitted to pass a Posted Request if the two Requester IDs are different. |
| C2a | An NPR with Data must not pass a Posted Request unless C2b applies. |
| C2b | An NPR with Data and with RO Set is permitted to pass Posted Requests. An NPR with Data and with IDO Set is permitted to pass a Posted Request if the two Requester IDs are different. |
| B3, B4, C3, C4 | A Non-Posted Request is permitted to pass another Non-Posted Request. |
| B5, C5 | A Non-Posted Request is permitted to pass a Completion. |
| D2a | A Completion must not pass a Posted Request unless D2b applies. |
| D2b | An I/O or Configuration Write Completion is permitted to pass a Posted Request. A Completion with RO Set is permitted to pass a Posted Request. A Completion with IDO Set is permitted to pass a Posted Request if the Completer ID of the Completion is different from the Requester ID of the Posted Request. |
| D3, D4 | A Completion must be able to pass Non-Posted Requests to avoid deadlocks. |
| D5a | Completions with different Transaction IDs are permitted to pass each other. |
| D5b | Completions with the same Transaction ID must not pass each other. This ensures that multiple Completions associated with a single Memory Read Request will remain in ascending address order. |

Figure 7:
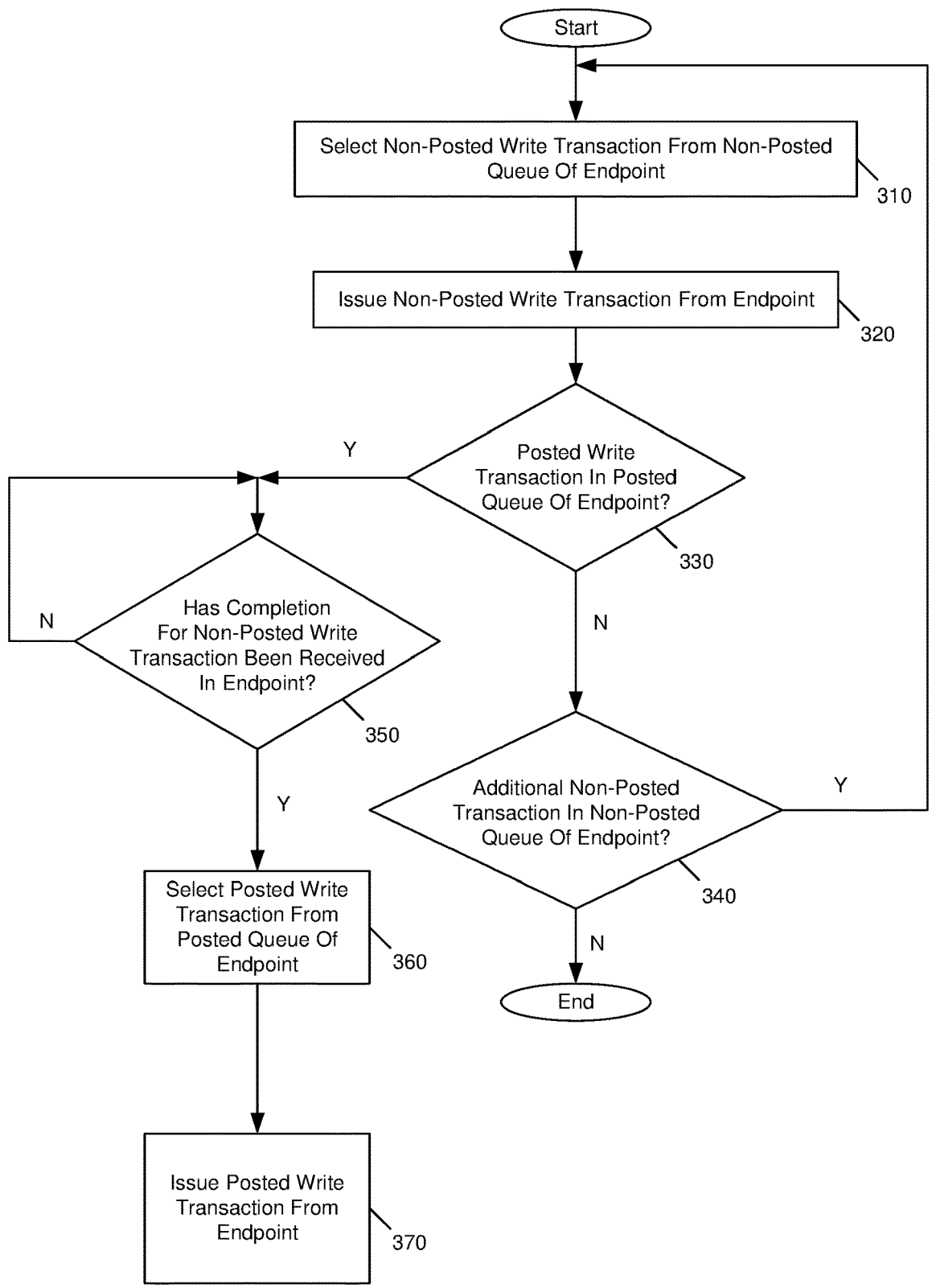
FIG. 7 is a flow diagram of a method in accordance with an embodiment of the present invention.

Referring now to FIG. 7, shown is a flow diagram of a method in accordance with an embodiment of the present invention. More specifically, method 300 shown in FIG. 7 is a method for generating non-posted memory write transactions on a given channel to be output from an agent such as an endpoint, and arbitrating between multiple pending transactions in the agent. As such, method 300 may be performed by hardware circuitry, software, firmware, and/or combinations thereof of a given agent, such as interface circuitry which may include an arbiter to perform at least portions of method 300. As illustrated, method 300 begins by selecting a non-posted write transaction that is present within a non-posted queue of the endpoint (block 310). As an example, a primary interface of the agent, which may be a PCI-based IP logic that is configured for supporting non-posted memory write transactions or a non-PCI device having such support, may select this non-posted memory write transaction according to various arbitration techniques, such as round robin, priority-based arbitration or so forth. Control next passes to block 320 where the non-posted write transaction may be issued from the endpoint. As one example, this transaction can be issued on a given channel (e.g., a first channel) to an upstream device, such as via direct communication to a fabric or via an intermediate bridge or other device. At this point, this non-posted memory write transaction is outstanding, and remains outstanding until a completion is received to indicate global observation of this write transaction.

Still with reference to FIG. 7, additional operations may occur within the agent. As illustrated, at diamond 330 it may be determined whether there is a posted write transaction within a posted queue of the endpoint. If not, control passes to diamond 340 where it may be determined whether there is an additional non-posted (read or write) transaction in the non-posted queue of the endpoint. If so, control passes back to block 310 where this transaction also can proceed to be sent from the agent. That is, one or more non-posted transactions may be issued while one or more non-posted write transactions are outstanding (namely have not yet received a completion).

Still with reference to FIG. 7, instead if it determined that a posted write transaction is present in the posted queue, control passes to diamond 350 to determine whether a completion has been received in the endpoint for the non-posted write transaction. If not, this posted write transaction is to be held until such completion is received. Thus as illustrated, when it is determined that the completion is received, control passes from diamond 350 to block 360 where the posted write transaction can be selected for output and accordingly at block 370 this posted write transaction is issued from the endpoint. Note that no further processing with regard to the posted write transaction occurs, as there is no completion to later be received when this transaction is globally observed, as such posted write transactions are fire and forget operations. Understand while shown at this high level in the embodiment of FIG. 7, many variations and alternatives are possible.

Figure 8:
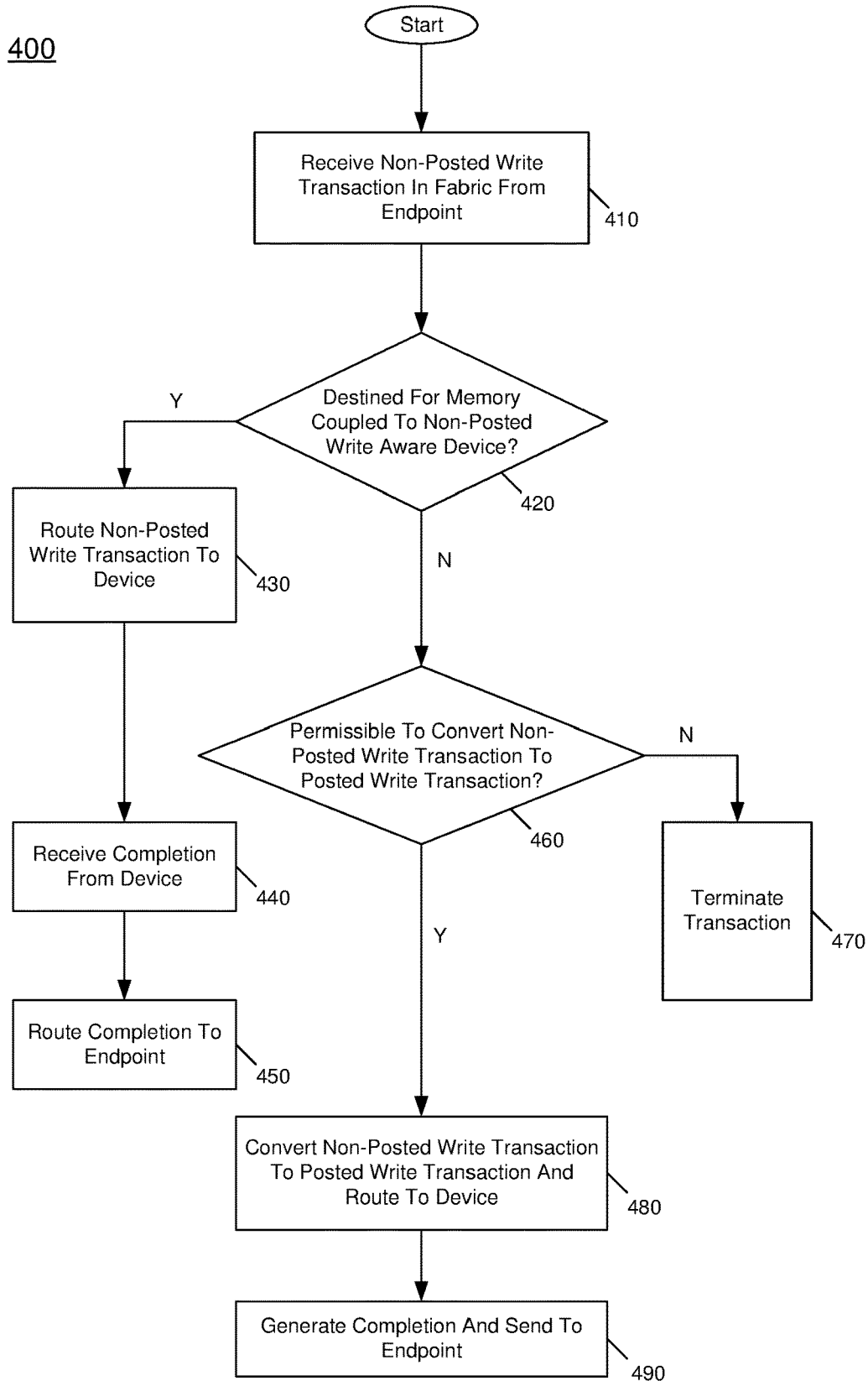
FIG. 8 is a flow diagram of a method in accordance with another embodiment of the present invention.

Referring now to FIG. 8, shown is a flow diagram of a method in accordance with another embodiment of the present invention. More specifically, method 400 shown in FIG. 8 may be performed by hardware circuitry, software, firmware and/or combinations thereof. More particularly, method 400 is a method for handling non-posted writes in a fabric or other receiving device that is configured to support non-posted write transactions. As such, in an embodiment, method 400 may be performed by control logic of a fabric.

As illustrated, method 400 begins by receiving a non-posted write transaction in a fabric from an endpoint (block 410). Note that in some cases the endpoint may directly couple to the fabric while in other cases there may be one or more intermediary devices such as a bridge or other device coupled between the endpoint and the fabric. Control next passes to diamond 420 to determine whether this non-posted write transaction is destined for a memory coupled to a non-posted write aware device. As described herein, such devices may include a variety of different PCI-based and non-PCI-based devices that are configured to support non-posted write transactions as described herein. If it is determined that the transaction is destined for a supported device, control passes to block 430 where the non-posted write transaction is routed to the device. As an example, this transaction can be routed to a memory controller that in turn is coupled to the memory. In other cases, the transaction can be routed to one or more intermediary devices that in turn couple to the memory. In any case, control passes to block 440 where a completion is received from the device to indicate that the non-posted memory write transaction has been globally observed. Thereafter at block 450 this completion may be routed to the endpoint. Note that at receipt of this completion at the endpoint, the memory write transaction is completed from the point of view of the endpoint and thus is no longer outstanding, such that posted write transactions or other transactions having ordering requirements with respect to this non-posted write transaction can proceed.

Still with reference to FIG. 8, instead if it is determined that the non-posted write transaction is destined for a memory coupled to a device that is not non-posted write aware, control passes to diamond 460 where the fabric determines whether it is permissible to convert this non-posted write transaction to a posted write transaction. This determination may be based on whether the fabric is capable of converting the transaction. If not permissible, control passes to block 470 where the transaction may be terminated. In some cases, an unsupported message may be sent as a completion back to the requester. Instead if it is determined that conversion is allowed, control passes to block 480, where the transaction can be converted to a posted write transaction and routed to the device. Still further, understand that the fabric can generate a completion and send this completion back to the endpoint to enable the endpoint to complete its non-posted memory write transaction (block 490). Note that this completion may be generated at the last possible place such as before egress on the port connected to the agent that does not support the non-posted memory write transaction. Understand while shown at this high level in the embodiment of FIG. 8, many variations and alternatives are possible.

Figure 9:
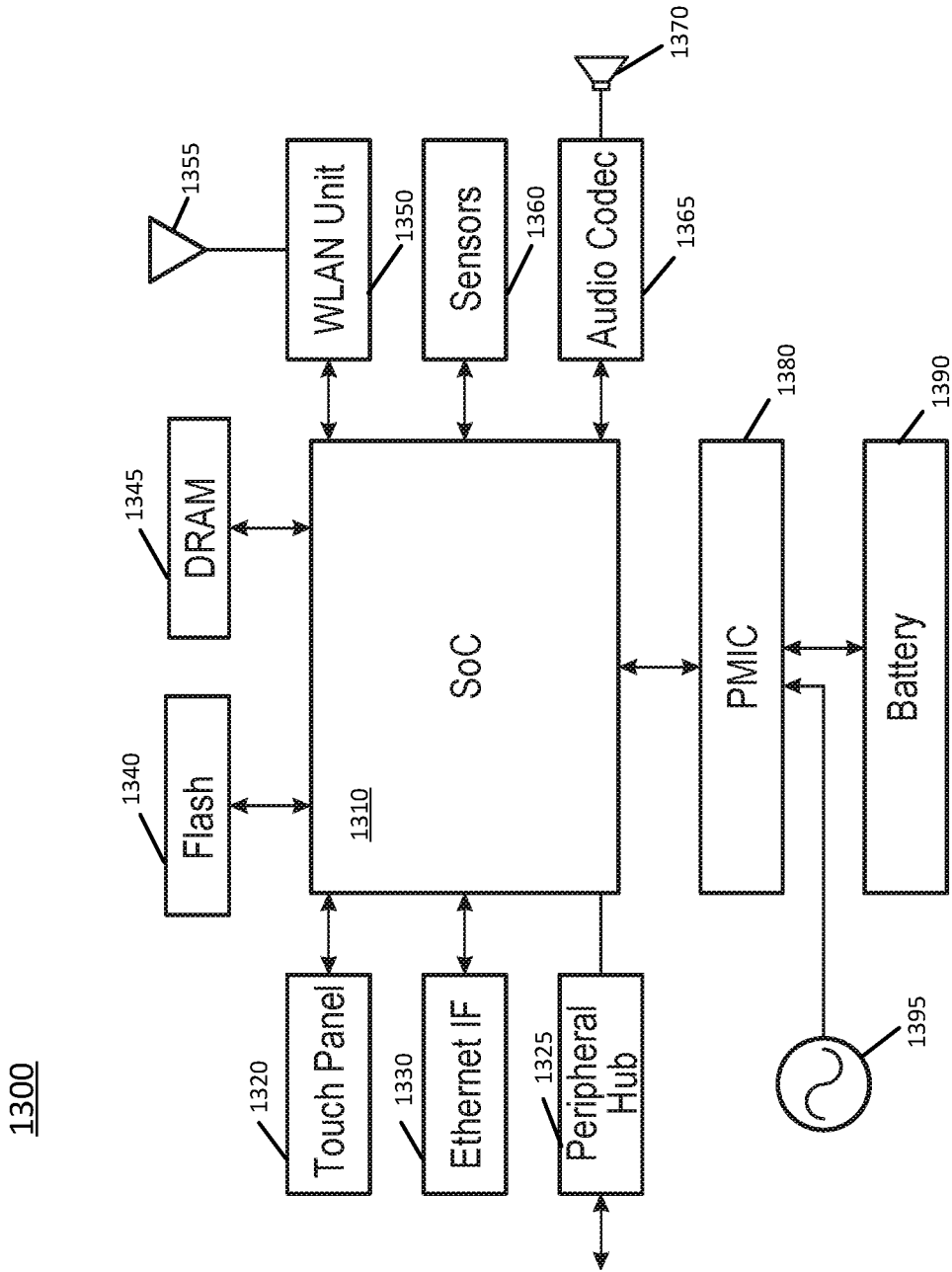
FIG. 9 is a block diagram of an example system with which embodiments may be used.

Referring now to FIG. 9, shown is a block diagram of an example system with which embodiments may be used. In the illustration of FIG. 9, system 1300 may be a mobile low-power system such as a tablet computer, 2:1 tablet, phablet or other convertible or standalone tablet system. As illustrated, a SoC 1310 is present and may be configured to operate as an application processor for the device. SoC 1310 may include agents and fabrics to support non-posted memory write transactions within a PCI context as described herein.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 9, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 9, many variations and alternatives are possible.

Figure 10:
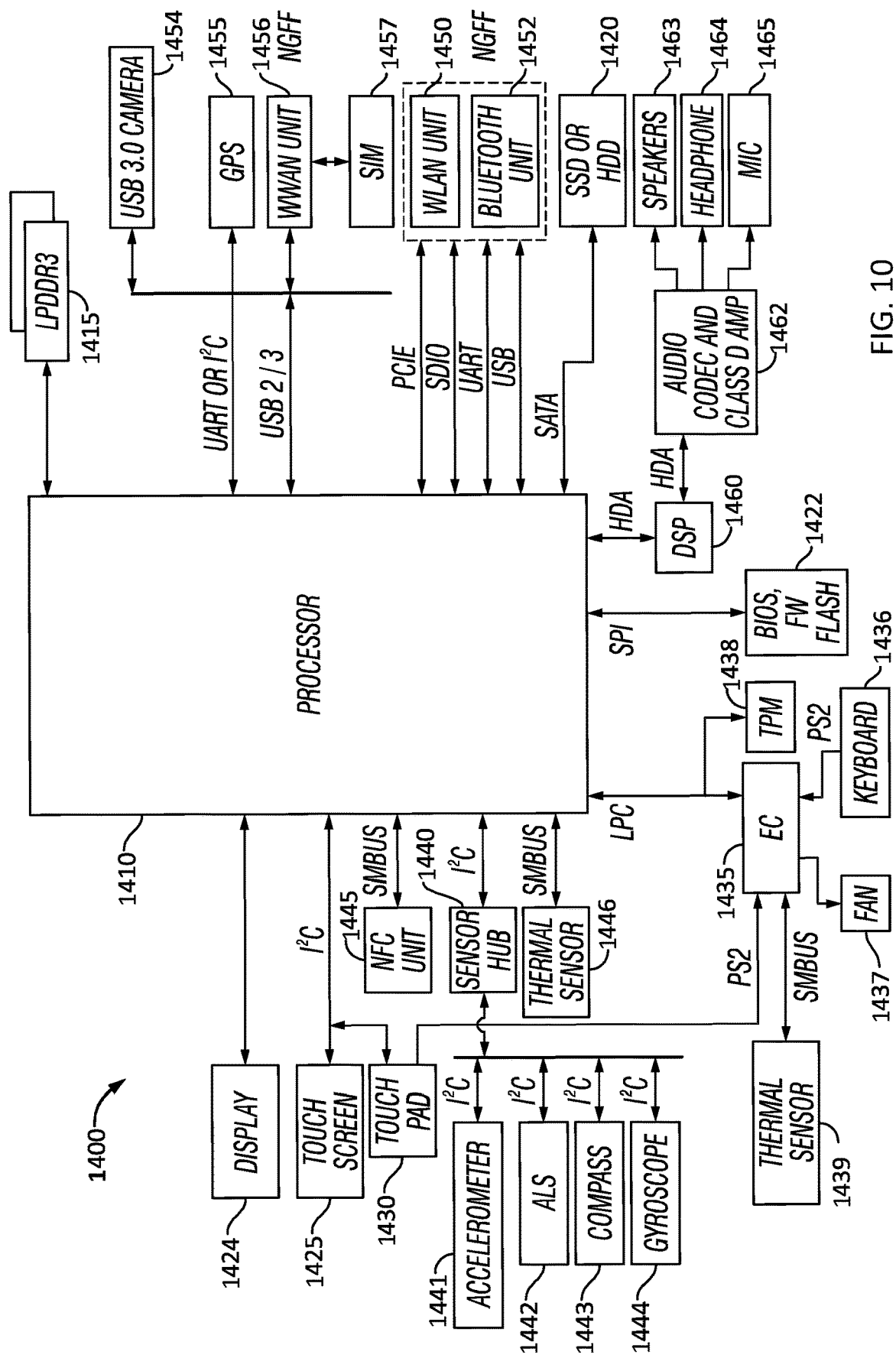
FIG. 10 is a block diagram of a representative computer system.

Referring now to FIG. 10, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400, and may include power management circuitry as described herein. As one example, processor 1410 is implemented as a SoC, and may include agents and fabrics that support non-posted memory write transactions as described herein. Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 10, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 10 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I$^2$C interconnect. As further shown in FIG. 10, in addition to touch screen 1425, user input by way of touch can also occur via a touch pad 1430 which may be configured within the chassis and may also be coupled to the same I$^2$C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I$^2$C interconnect. In the embodiment shown in FIG. 10, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 10, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 10, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 10, additional wireless units can include other short range wireless engines including a WLAN unit 1450 and a Bluetooth™ unit 1452. Using WLAN unit 1450, Wi-Fi™ communications can be realized, while via Bluetooth™ unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 10, WWAN unit 1456 and an integrated capture device such as a camera module 1454 may communicate via a given link.

To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 10, understand the scope of the present invention is not limited in this regard.

Figure 11:
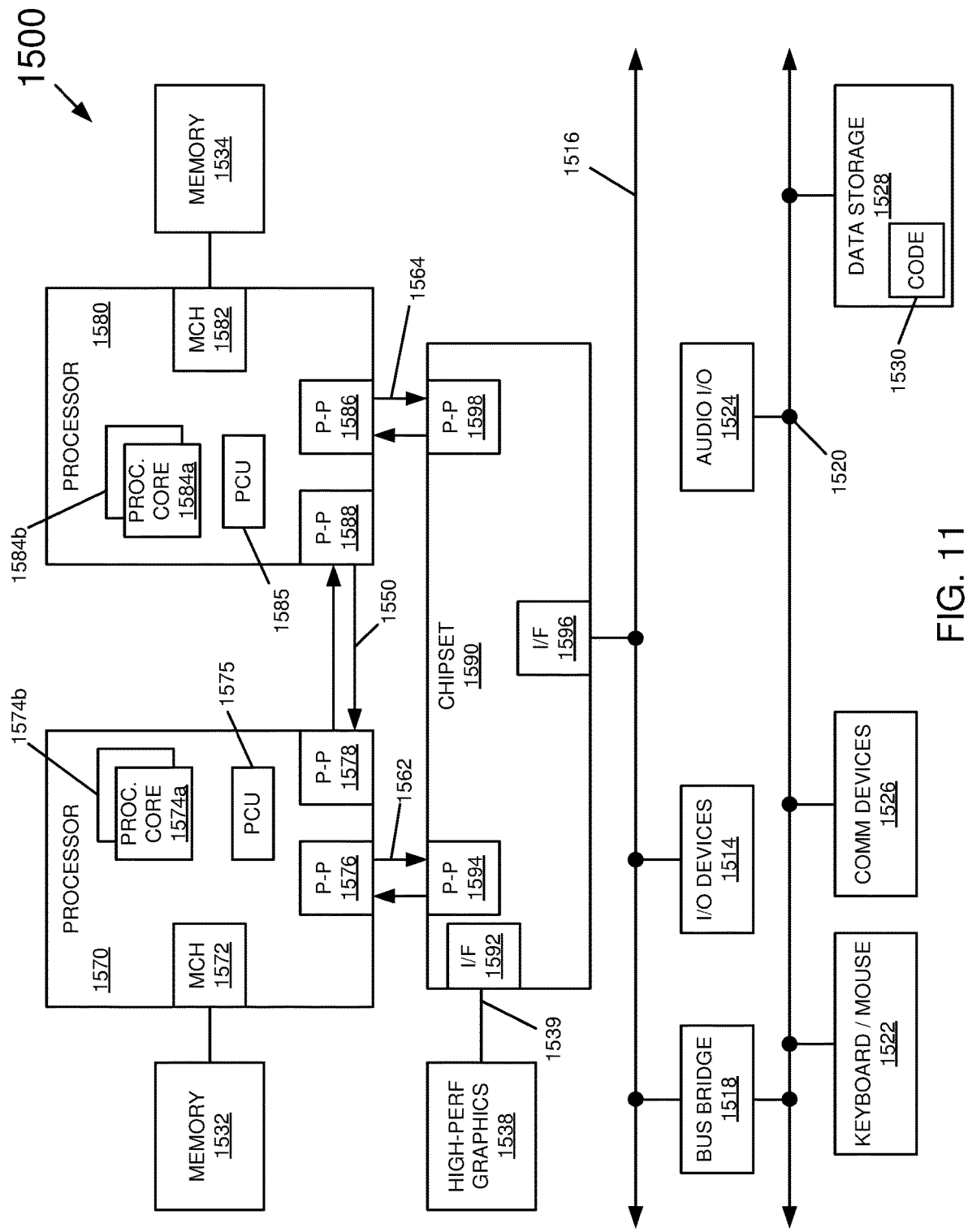
FIG. 11 is a block diagram of a system in accordance with an embodiment of the present invention.

Embodiments may be implemented in many different system types. Referring now to FIG. 11, shown is a block diagram of a system in accordance with an embodiment of the present invention. As shown in FIG. 11, multiprocessor system 1500 is a point-to-point interconnect system, and includes a first processor 1570 and a second processor 1580 coupled via a point-to-point interconnect 1550. As shown in FIG. 11, each of processors 1570 and 1580 may be multicore processors, including first and second processor cores (i.e., processor cores 1574a and 1574b and processor cores 1584a and 1584b), although potentially many more cores may be present in the processors. Each of the processors can include a PCU (1575, 1585) or other power management logic to perform processor-based power management. Such processors may further be configured to handle non-posted memory write transactions within a PCI context as described herein.

Still referring to FIG. 11, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 10, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 11, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 10, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

The following Examples pertain to further embodiments.

In one example, a SoC is formed with a semiconductor die including: a plurality of agents including a first endpoint to issue a non-posted memory write transaction to a memory; and a fabric to couple the plurality of agents, the fabric including a primary interface having a plurality of channels, the fabric comprising a PCI-based fabric, the fabric including control logic to direct the non-posted memory write transaction to the memory, receive a completion for the non-posted memory write transaction from the memory and route the completion to the first endpoint.

In an example, the first endpoint is to wait for receipt of the completion before issuance of a posted write transaction, to ensure write-data consistency.

In an example, the completion does not include data.

In an example, the fabric is to receive the non-posted memory write transaction via a first channel of the first endpoint and direct the non-posted memory write transaction to the memory via a first channel of the fabric mapped to the first channel of the first endpoint.

In an example, first endpoint is to issue a second non-posted memory write transaction while the non-posted memory write transaction is outstanding.

In an example, the first endpoint is to wait for receipt of a second completion for the second non-posted memory write transaction before issuance of a posted write transaction, to ensure write-data consistency.

In an example, the first endpoint comprises a non-PCI logic to natively support the non-posted write transaction.

In an example, the fabric comprises an integrated on-chip system fabric, where a protocol of the integrated on-chip system fabric does not natively support non-posted memory write transactions.

In an example, the fabric is to convert the non-posted memory write transaction to a posted write transaction and send the posted write transaction to a PCI-based fabric that does not support the non-posted memory write transaction.

In an example, the fabric is to forward the non-posted memory write transaction to a second fabric comprising a non-PCI-based fabric that natively supports non-posted memory write transactions.

In an example, the fabric is to prevent the non-posted memory write transaction from passing a posted write transaction.

In another example, a method comprises: sending a non-posted memory write transaction from an endpoint of a SoC to a primary fabric of the SoC to enable the primary fabric to direct the non-posted write transaction to a memory coupled to the SoC, the endpoint comprising a PCI-based endpoint and the primary fabric to support PCI ordering rules; when a posted write transaction is present in a posted queue of the endpoint, determining whether the endpoint has received a completion for the non-posted memory write transaction; and preventing the posted write transaction from being sent from the endpoint to the primary fabric until determining that the endpoint has received the completion for the non-posted memory write transaction.

In an example, the method further comprises sending a second non-posted memory write transaction from the endpoint to the primary fabric before the endpoint receives the completion for the non-posted memory write transaction.

In an example, the method further comprises sending a plurality of non-posted memory write transactions from the endpoint to the primary fabric, while one or more prior non-posted memory write transactions sent by the endpoint are outstanding.

In an example, the method further comprises: sending a second non-posted memory write transaction from a second endpoint of the SoC to the primary fabric, the second endpoint comprising a non-PCI-based IP logic and the primary fabric comprising a PCI-based fabric configured to support non-posted memory write transactions.

In an example, the method further comprises: receiving a second non-posted memory write transaction in the endpoint from a requester; converting the second non-posted memory write transaction to a posted write transaction and sending the posted write transaction to a second fabric coupled to the endpoint, the second fabric comprising a PCI-based fabric not configured to support non-posted memory write transactions; and sending a completion for the second non-posted memory write transaction to the requester.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a system comprises: a SoC and a memory coupled to the SoC. The SoC may comprise: one or more cores to execute instructions; a coherent interconnect coupled to the one or more cores; a memory controller coupled to the coherent interconnect; a plurality of agents including: a first endpoint to issue a non-posted memory write transaction, the first endpoint comprising a PCI-based endpoint; a second non-PCI-based endpoint to issue a second non-posted memory write transaction; and a fabric to couple at least some of the plurality of agents, the fabric including control logic to direct at least the first non-posted memory write transaction to a memory, receive a first completion for the first non-posted memory write transaction and route the first completion to the first endpoint.

In an example, the second endpoint comprises a third party IP logic.

In an example, the fabric is to forward the second non-posted memory write transaction to a second fabric, the second fabric comprising a non-PCI-based fabric.

In an example, the first endpoint is to issue another non-posted memory write transaction while the first non-posted memory write transaction is outstanding, and prevent issuance of a posted write transaction until the first endpoint has received the completion and another completion for the another non-posted memory write transaction.

In a still further example, an apparatus comprises: means for sending a non-posted memory write transaction from an endpoint to a primary fabric to enable the primary fabric to direct the non-posted write transaction to a memory, the endpoint comprising a PCI-based endpoint and the primary fabric to support PCI ordering rules; means for determining whether the endpoint has received a completion for the non-posted memory write transaction; and means for preventing a posted write transaction stored in a posted queue of the endpoint from being sent from the endpoint to the primary fabric until the endpoint has received the completion for the non-posted memory write transaction.

In an example, the apparatus further comprises means for sending a second non-posted memory write transaction from the endpoint to the primary fabric before the endpoint receives the completion for the non-posted memory write transaction.

In an example, the apparatus further comprises means for sending a plurality of non-posted memory write transactions from the endpoint to the primary fabric, while one or more prior non-posted memory write transactions sent by the endpoint are outstanding.

In an example, the apparatus further comprises means for sending a second non-posted memory write transaction from a second endpoint to the primary fabric, the second endpoint comprising a non-PCI-based IP logic and the primary fabric comprising a PCI-based fabric configured to support non-posted memory write transactions.

In an example, the apparatus further comprises: means for receiving a second non-posted memory write transaction in the endpoint from a requester; means for converting the second non-posted memory write transaction to a posted write transaction and sending the posted write transaction to a second fabric coupled to the endpoint, the second fabric comprising a PCI-based fabric not configured to support non-posted memory write transactions; and means for sending a completion for the second non-posted memory write transaction to the requester.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a device to couple to a memory; and
a Peripheral Component Interconnect (PCI)-compatible fabric to couple an endpoint and the device, the PCIe-compatible fabric including a control circuit to receive a non-posted memory write transaction from the endpoint, direct the non-posted memory write transaction to the device, receive a completion for the non-posted memory write transaction from the device and route the completion to the endpoint.

2. The apparatus of claim 1, further comprising:
the endpoint to send the non-posted memory write transaction towards the PCI-compatible fabric; and
the memory.

3. The apparatus of claim 1, wherein the non-posted memory write transaction comprises a 32-bit address.

4. The apparatus of claim 1, wherein the non-posted memory write transaction comprises a 64-bit address.

5. The apparatus of claim 1, wherein the completion is a completion without data.

6. The apparatus of claim 1, wherein the apparatus is to prevent the non-posted memory write transaction from passing a first posted write transaction.

7. The apparatus of claim 1, wherein the apparatus is to cause a second non-posted memory write transaction to pass a second posted write transaction, wherein the second non-posted memory write transaction comprises a set relaxed ordering attribute.

8. The apparatus of claim 1, wherein the apparatus is to optionally enable the non-posted memory write transaction to pass a non-posted read transaction.

9. At least one computer readable storage medium having stored thereon instructions, which if performed by a machine cause the machine to:
receive, in a Peripheral Component Interconnect (PCI)-compatible fabric that is arranged to couple an endpoint and a device associated with a memory, a non-posted memory write transaction from the endpoint;
direct the non-posted memory write transaction from the PCI-compatible fabric to the device;
receive, in the PCI-compatible fabric, a completion for the non-posted memory write transaction from the device; and
route the completion to the endpoint.

10. The computer readable medium of claim 9, wherein the computer readable storage medium further has stored thereon instructions, which if performed by the machine cause the machine to receive the non-posted memory write transaction having a 32-bit address.

11. The computer readable medium of claim 9, wherein the computer readable storage medium further has stored thereon instructions, which if performed by the machine cause the machine to receive the non-posted memory write transaction having a 64-bit address.

12. The computer readable medium of claim 9, wherein the computer readable storage medium further has stored thereon instructions, which if performed by the machine cause the machine to receive the completion comprising a completion without data.

13. The computer readable medium of claim 9, wherein the computer readable storage medium further has stored thereon instructions, which if performed by the machine cause the machine to prevent the non-posted memory write transaction from passing a first posted write transaction.

14. The computer readable medium of claim 9, wherein the computer readable storage medium further has stored thereon instructions, which if performed by the machine cause the machine to cause a second non-posted memory write transaction to pass a second posted write transaction, wherein the second non-posted memory write transaction comprises a set relaxed ordering attribute.

15. A system comprising:
an endpoint to issue a non-posted memory write transaction to a memory;
a device to couple with the memory;
a central processing unit; and
a Peripheral Component Interconnect (PCI)-compatible fabric coupled to the central processing unit and to couple the endpoint and the device, the (PCI)-compatible fabric including a control circuit to process the non-posted memory write transaction from the endpoint and route a completion for the non-posted memory write transaction from the device to the endpoint.

16. The system of claim 15, wherein the non-posted memory write transaction comprises a 32-bit address.

17. The system of claim 15, wherein the non-posted memory write transaction comprises a 64-bit address.

18. The system of claim 15, wherein the completion is a completion without data.

19. The system of claim 15, wherein the system is to prevent the non-posted memory write transaction from passing a first posted write transaction.

20. The system of claim 15, wherein the system is to cause a second non-posted memory write transaction to pass a second posted write transaction, wherein the second non-posted memory write transaction comprises a set relaxed ordering attribute.

21. The system of claim 15, wherein the system is to optionally enable the non-posted memory write transaction to pass a non-posted read transaction.

22. An apparatus comprising:
   an endpoint comprising:
   an intellectual property (IP) logic, the IP logic to issue a non-posted memory write transaction to a memory via a fabric, wherein the endpoint is to receive a completion for the non-posted memory write transaction;
   a buffer to store transactions including the non-posted memory write transaction; and
   an arbiter coupled to the buffer, wherein the arbiter is to select and output the non-posted memory write transaction.

23. The apparatus of claim 22, wherein the IP logic is to issue the non-posted memory write transaction comprising a 64-bit address.

24. The apparatus of claim 22, wherein the endpoint comprises a Peripheral Component Interconnect Express (PCIe)-based endpoint.

25. A system comprising:
   a central processing unit (CPU); and
   a root complex coupled to the CPU, wherein the root complex comprises at least one root port to receive a non-posted memory write transaction from an endpoint, direct the non-posted memory write transaction to a memory, receive a completion for the non-posted memory write transaction and route the completion to the endpoint.

26. The system of claim 25, further comprising a fabric coupled to the root complex, wherein the fabric comprises a plurality of virtual channels.

* * * * *